US009639072B2

(12) United States Patent
Burke

(10) Patent No.: US 9,639,072 B2
(45) Date of Patent: May 2, 2017

(54) TEMPERATURE GRADIENT REDUCTION USING BUILDING MODEL AND HVAC BLOWER

(71) Applicant: General Electric Company, Schenectady, NY (US)

(72) Inventor: William Jerome Burke, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 1183 days.

(21) Appl. No.: 13/705,535

(22) Filed: Dec. 5, 2012

(65) Prior Publication Data
US 2014/0156083 A1 Jun. 5, 2014

(51) Int. Cl.
G05B 13/02 (2006.01)
G05B 15/02 (2006.01)
G05B 17/02 (2006.01)

(52) U.S. Cl.
CPC .............. *G05B 15/02* (2013.01); *G05B 17/02* (2013.01); *G05B 2219/2614* (2013.01)

(58) Field of Classification Search
CPC G05B 13/02; G05B 15/02; G05B 2219/2614; G05B 17/02
USPC .......................................................... 700/276
See application file for complete search history.

(56) References Cited

U.S. PATENT DOCUMENTS

| 4,754,919 | A | * | 7/1988 | Otsuka | F24F 11/0009 165/205 |
|---|---|---|---|---|---|
| 4,795,088 | A | * | 1/1989 | Kobayashi | F24F 11/0009 165/217 |
| 4,811,897 | A | | 3/1989 | Kobayashi et al. | |
| 5,179,524 | A | * | 1/1993 | Parker | G05D 23/1934 165/217 |
| 5,303,767 | A | * | 4/1994 | Riley | F24F 3/044 165/208 |
| 5,318,104 | A | * | 6/1994 | Shah | F24F 11/0009 165/208 |
| 5,485,953 | A | * | 1/1996 | Bassett | F24F 11/00 165/218 |
| 7,354,005 | B2 | * | 4/2008 | Carey | F24F 3/0442 236/46 R |
| 8,190,273 | B1 | * | 5/2012 | Federspiel | F24F 11/006 700/17 |
| 2004/0238653 | A1 | * | 12/2004 | Alles | F24F 3/0442 236/49.3 |
| 2005/0289467 | A1 | * | 12/2005 | Imhof | G05B 15/02 715/734 |

(Continued)

FOREIGN PATENT DOCUMENTS

JP          4032634 A          2/1992

*Primary Examiner* — Miranda Huang
*Assistant Examiner* — Olvin Lopez Alvarez
(74) *Attorney, Agent, or Firm* — Dority & Manning, P.A.

(57) ABSTRACT

A system is provided for reducing temperature gradients within a building. For example, temperature gradients between the air temperature measured at a thermostat controlling an HVAC system and the air temperature in one or more rooms of the building can be reduced. A model of the building is created by measuring the temperature gradient between the thermostat and one or more rooms of the building. This model is used to determine the operation of the HVAC system so as to reduce one or more of such temperature gradients.

17 Claims, 2 Drawing Sheets

(56) References Cited

U.S. PATENT DOCUMENTS

| | | | |
|---|---|---|---|
| 2006/0099904 A1* | 5/2006 | Belt | F24F 7/06 454/236 |
| 2006/0186213 A1* | 8/2006 | Carey | F24F 3/0442 236/1 B |
| 2007/0039338 A1* | 2/2007 | Perry | F24F 3/044 62/178 |
| 2009/0099699 A1* | 4/2009 | Steinberg | F24F 11/006 700/278 |
| 2010/0023168 A1* | 1/2010 | Kai | F24F 11/0012 700/278 |
| 2010/0127880 A1* | 5/2010 | Schechter | G01K 1/024 340/584 |
| 2010/0163633 A1* | 7/2010 | Barrett | B60H 1/00871 236/49.3 |
| 2012/0072181 A1* | 3/2012 | Imani | G06F 17/5004 703/1 |

* cited by examiner

TEMPERATURE GRADIENT REDUCTION USING BUILDING MODEL AND HVAC BLOWER

FIELD OF THE INVENTION

The subject matter of the present disclosure relates generally to the use of one or more models to reduce the temperature gradients between various locations in a building using one or more blowers of an HVAC system for such building.

BACKGROUND OF THE INVENTION

Commercial and residential buildings or structures are commonly equipped with systems for regulating the temperature of the air within the building for purposes of e.g., comfort, protection of temperature sensitive contents, etc. Sometimes referred to as heating, ventilating, and air conditioning or HVAC systems, such typically include one or more components for changing the temperature of the air (i.e. air treatment components as used herein) along with one or more components for causing movement of the air within the building (i.e. blowers as used herein). For example, a refrigerant based heat pump may be provided for heating or cooling the air. Alternatively, or in addition thereto, electrically resistant heat strips and/or gas burners may be provided for heating the air. One or more blowers or fans may be provided for causing the heated or cooled air to circulate within the building in an effort to treat all or some controlled portion of air in the building. Ducting and vents may be used to help distribute and return air from different rooms or zones within the building.

Typically, an HVAC system is controlled by a single thermostat having a fixed location in the building being treated. In conventional systems, the thermostat typically measures the air temperature at this same fixed location. This temperature measurement is compared with a set point temperature and the HVAC system is activated or deactivated depending upon whether the set point temperature has been reached or, more commonly, depending upon whether the temperature difference between the set point temperature and the air temperature measured by the thermostat is sufficient to trigger activation or deactivation.

Although simplistic, such conventional system has certain deficiencies. For example, the air temperature as measured by the thermostat may not be representative of the air temperature at other locations in the building. Such other locations may be separate rooms and/or other locations (sometimes referred to as "zones" or "temperature zones") remote enough from the thermostat to be at a different air temperature than the air near the thermostat. For residential buildings, the thermostat is frequently placed along a hall located well within the interior of the building. The air in rooms that include one or more exterior walls of the building may be heated or cooled more rapidly than air in the hallway. As a result, the temperature gradient or temperature difference between the air temperature at the thermostat and the air in such rooms may be substantial. Yet, even though the air temperature in such rooms may be much different than the set point temperature desired, the thermostat may not activate the HVAC system because the air temperature at the thermostat may be at, or close to, the set point temperature.

Conversely, the thermostat could be in an area that that is subject to substantial temperature fluctuations that trigger the operation of the HVAC system even though the air temperatures throughout a substantial portion of the building are close to the desired setpoint. As a result, the HVAC system will continue to operate in order to drive the air temperature near the thermostat towards the setpoint temperature—causing other portions of the building to be colder or hotter than desired.

Temperature gradients within the building may not be limited to those between the air temperature measured at the thermostat and the air at a remote room. There may also be temperature gradients between various rooms in the building. For example, a room having an exterior wall located on one end of a building may have an air temperature quite different from that of another room located at a different end of the building. This can be caused, e.g., by differences in solar heating of the building based on its orientation relative to the path of the sun over the course of the day. These differences can also be affected by the time of the year such as summer versus winter seasons.

Such problems can lead to e.g., user discomfort in different rooms or zones of the building, inefficient operation of the HVAC system, and other problems. Also, a user may attempt to manipulate the set point temperature of the HVAC system, which can inefficiently increase energy usage and may only exacerbate the problem.

By way of example, one potential solution is to use multiple thermostats placed throughout the building. However, this approach can add substantial additional cost to the HVAC system. Furthermore, simply activating the HVAC system because one of the thermostats experience an air temperature that is not at the setpoint may not effectively reduce temperature gradients throughout the building.

Accordingly, a system for reducing the temperature gradients between various rooms or temperature zones within a building would be useful. More particularly, a system that provides for a more uniform temperature within the building would be beneficial. Such a system that can operate one or more blowers of an HVAC system to reduce such temperature gradients would be particularly beneficial. Such a system that can also be used with a variety of different building types and/or configurations would also be very useful.

BRIEF DESCRIPTION OF THE INVENTION

The present invention provides a system for reducing temperature gradients within a building. More particularly, the present invention provides for reducing temperature gradients between the air temperature measured at a thermostat controlling an HVAC system and the air temperature in one or more rooms or temperature zones of the building. A model of the building is created by measuring the temperature gradient between the thermostat and one or more rooms or temperatures zones of the building. This model is used to determine the operation of the HVAC system so as to reduce one or more of such temperature gradients. Additional aspects and advantages of the invention will be set forth in part in the following description, or may be apparent from the description, or may be learned through practice of the invention.

In one exemplary aspect, the present invention provides a method of reducing temperature gradients in a building having multiple rooms, the building also having an HVAC system that includes at least one thermostat, at least one blower, one or more air treatment components for cooling the air, heating the air, or both. The method includes the steps of measuring the temperatures $T_{ST}$ near the thermostat and temperatures $T_i$ of a room i in the building over a period of time $\Delta t_{measure}$ that includes operation of the HVAC system; determining the operating states of the HVAC system during the period of time $\Delta t_{measure}$; providing a model $M_{\Delta Ti}$ of the temperature difference $\Delta T_i$ between the temperature at the thermostat $T_{ST}$ and the temperature $T_i$ of room i as function of the operating state of the HVAC system; repeating said steps of measuring, determining, and providing for N−1 additional rooms in the building so as to provide a model $M_{\Delta Ti}$ of the temperature difference $\Delta T_i$ between the temperature at the thermostat $T_T$ and the temperature $T_i$ of each such additional room as function of the operating state of the HVAC system for a total of N rooms; combining N models $M_{\Delta Ti}$ of the N rooms in the building so as to create an overall model $M_{\Delta T\text{-}ALL}$ of the building; and using the model $M_{\Delta T\text{-}ALL}$ to determine whether to operate the blower so as to reduce one or more temperature gradients in the building.

In still another exemplary aspect, the present invention provides a method of reducing temperature gradients in a building that includes multiple temperature zones. The method includes the steps of obtaining the temperatures at a thermostat in the building and in a first temperature zone of the building over a first period of time, the building having multiple temperature zones, the building also having an HVAC system that includes at least one thermostat, at least one blower, one or more air treatment components for cooling the air, heating the air, or both, the first period of time occurring while the blower and at least one air treatment component of the HVAC system is operating; acquiring the temperatures at the thermostat and the first temperature zone of the building over a second period of time, the second period of time occurring while only the blower of the HVAC system is operating; developing a model of the temperature in first temperature zone as a function of the state of the HVAC system using temperatures from said steps of obtaining and acquiring; repeating said steps of obtaining, acquiring, and developing for one or more additional temperature zones of the building so as to provide a model for each such additional temperature zone; combining the models from said steps of developing and repeating so as to provide an overall model for multiple temperature zones of the building; and using the overall model to determine when to operate the blower of the HVAC system so as to reduce temperature gradients between one or more temperature zones in the building and the thermostat.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
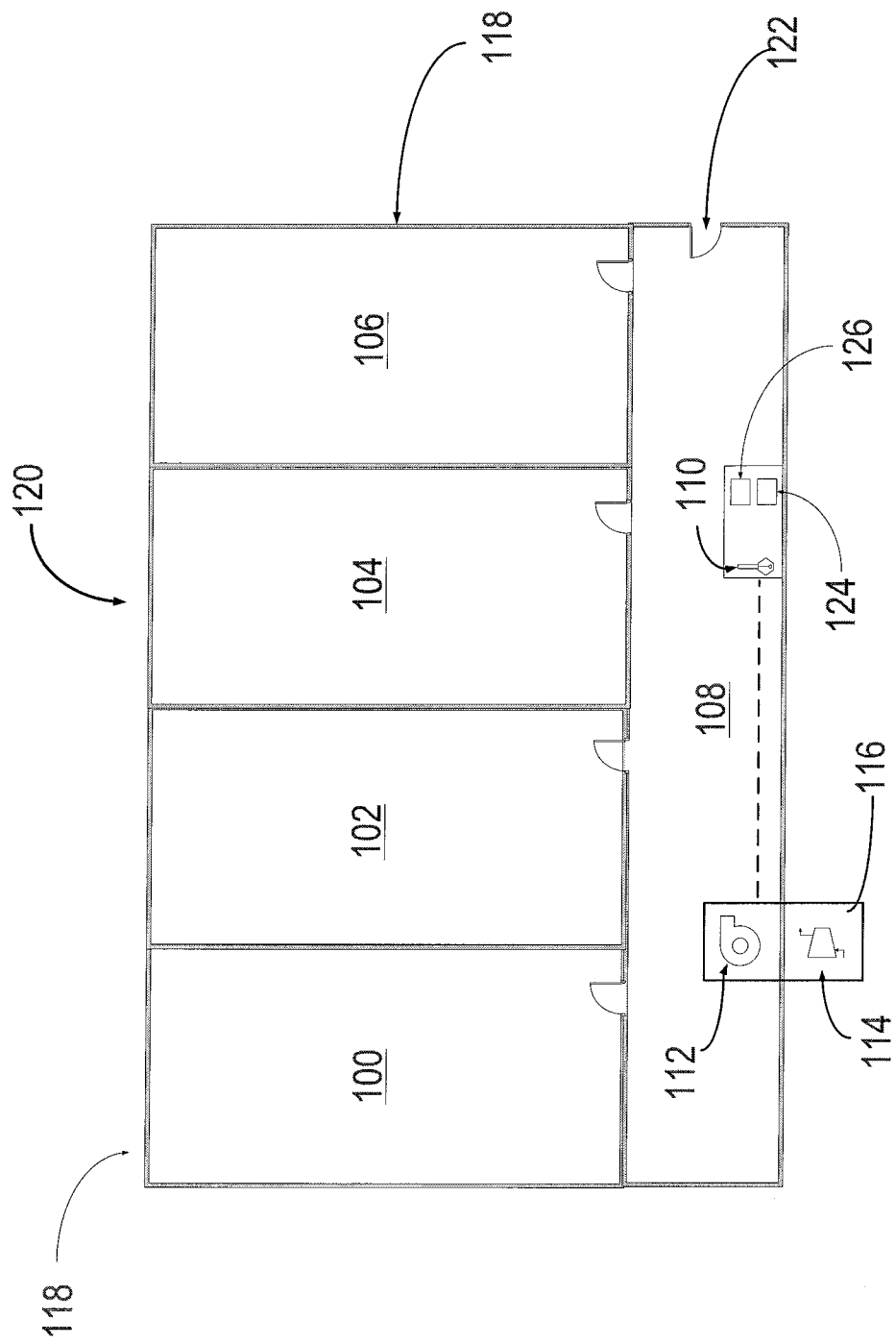
FIG. 1 provides a schematic representation of an exemplary building as may be used with the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a simplified floor plan of a building 120 having rooms 100, 102, 104, and 106 connected by a hallway 108. A thermostat 110 is located in hallway 108 and controls an HVAC system 116 that includes at least one blower 112 and an air treatment component 114. In a manner that will be understood by one of skill in the art, blower 112 circulates air through a duct system (not shown) in building 120 to provide heated or cooled air to one or more of rooms 100, 102, 104, and 106 as well as hallway 108.

By way of example, air treatment component 114 could be a heat pump (as depicted) that provides for both heating and cooling of the air circulated by blower 112. Alternatively, air treatment component 114 could be a heater based on e.g., one or more gas burners or electric strips. Although only one blower 112 is shown, more than one blower may be used and controlled according to the invention disclosed herein. Similarly, although only one air treatment component is shown for HVAC system 116, more than one may be used and controlled according to the invention disclosed herein.

Also, the shape and configuration of building 120 is provided by way of example only. Buildings having different shapes, configurations, different numbers of rooms, hallways, etc.—both residential and commercial—may be used with the present invention. The location of HVAC system 116 and thermostat 116 is also by way of example only.

As set forth previously, although it is common to use a single thermostat 116 to control HVAC system 116, certain problems are created by having thermostat 116 at a fixed position within building 120 as shown. For example, the temperature of the air near thermostat 120 in hallway 108 may be quite different from the temperature of the air in anyone of rooms 100, 102, 104, or 106—i.e. temperature gradients $\Delta T_i$ may exist between the temperature measured at thermostat 120 and the temperature in any one of the rooms i. Temperature gradients $\Delta T$ may also exist between rooms 100, 102, 104, and 106. For example, rooms 100 and 106 include large portions of the exterior wall 118. Depending upon the orientation of building 100 relative to the sun and the location of building relative to other objects such as trees, buildings, etc.—one side of building 100 may receive more solar heating than another side at certain times of the day. Air flow through door 122 can also cause temperature gradients within building 120 as well.

Figure 2:
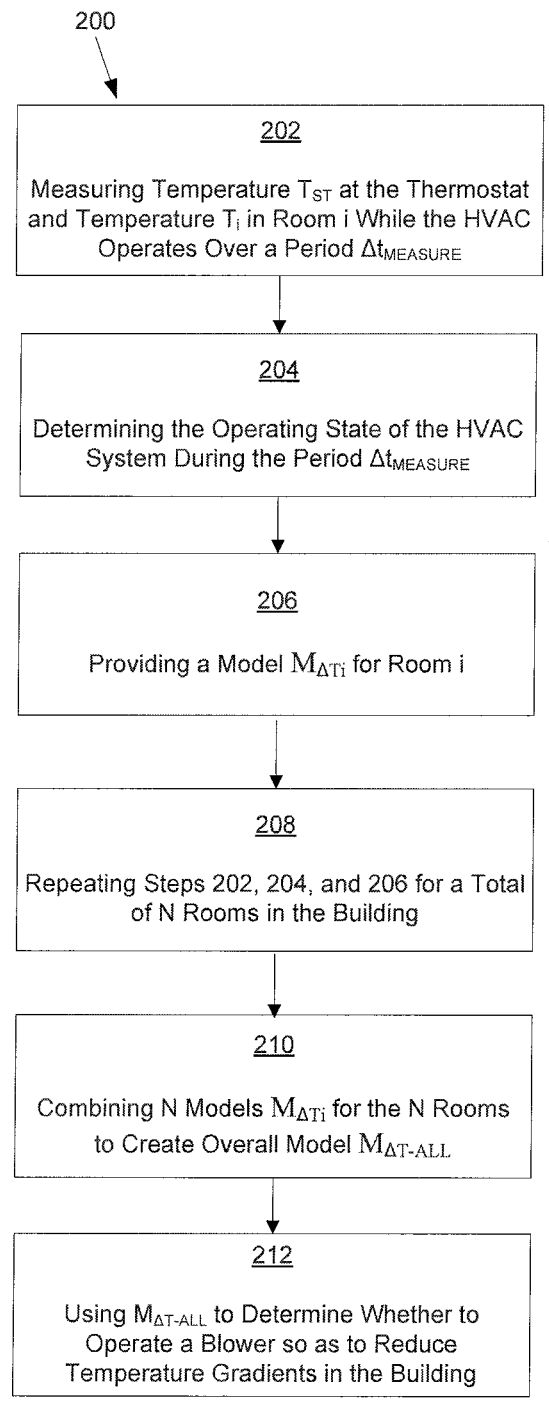
FIG. 2 illustrates a flow chart depicting an exemplary method of the present invention.

FIG. 2 sets forth an exemplary method 200 for reducing one or more of the temperature gradients described above. Method 200 will be described using building 120 of FIG. 1 by way of example. Using the teachings disclosed herein, it will be understood that method 200 could also be applied to buildings other than building 120 as well. Method 200 will be described in terms of reducing the temperature gradient $\Delta T_i$ between different rooms i of building 120. However, the method of the invention can also be used between different temperature zones of a building regardless of whether each temperature zone represents a different room. For example, building 120 might be divided into zones where each zone includes more than one room or where a zone simply includes an area remote from the thermostat but not necessarily a separate room.

Furthermore, not necessarily every room or zone within a building must be included in application of the method. For example, the method could be used to reduce temperature gradients between the largest rooms within a structure without necessarily attempting to measure and reduce temperature gradients between the thermostat and smaller rooms such as e.g., closets, bathrooms, and others. It will be understood herein that references to measuring the temperature or obtaining the temperature refer to the temperature of the air in the building at the location identified.

The method of the invention could be performed as steps programmed into a controller or other processing device such as e.g., controller 124 that may be included with thermostat 110. Controller 124 could be in communication with e.g., a graphic user display device 126 or other device whereby a user can interact with the controller and provide as well as receive instructions and information from the controller. As used herein, "controller" may include a memory and one or more microprocessors, CPUs or the like, such as general or special purpose microprocessors operable to execute programming instructions or micro-control code associated with operation of HVAC system 116. The memory may represent random access memory such as DRAM, or read only memory such as ROM or FLASH. In one embodiment, the processor executes programming instructions stored in memory. The memory may be a separate component from the processor or may be included onboard within the processor.

For purposes of creating a model of the temperature behavior within building 120, in step 202 the temperatures $T_{ST}$ at thermostat 110 and temperature $T_i$ of a room i (such as e.g., room 100) in building 120 are measured over a period of time $\Delta t_{measure}$. This period of time $\Delta t_{measure}$ includes operation of the HVAC system 116. For example, the thermostat could be provided with a user interface and display whereby the user is instructed to position a temperature sensor—such as e.g., a temperature sensor with a wireless connection to the thermostat—in a first room i such as room 100 of building 120.

A variety of temperature sampling schemes could be employed. For example, the temperatures at the thermostat and in room i could be measured every 30 seconds over a predetermined time period such as e.g., 5 minutes, 10 minutes or others. Alternatively, $\Delta t_{measure}$ could simply be a period of time over which enough temperature data is acquired to provide a model. In still another alternative, $\Delta t_{measure}$ could be a period of time over which a certain amount of temperature change in room i is measured such as e.g., 1, 2, or 5 degrees ° C. The time period $\Delta t_{measure}$ to use could also be calculated. Other techniques may be used as well.

In step 204, the operating states of HVAC system during the period of time $\Delta t_{measure}$ is determined. For example, at the time the temperature measurements in step 202 are taken, the operating state of the HVAC is determined including e.g., whether blower 112 was on or off, and whether each air treatment component 114 (heat pump, compressor, gas or electric heater) was on or off. For purposes of creating the model, the temperature measurements in step 202 are taken over time intervals when the blower 112 is operating both with and without the air treatment component 114 operating. Thus, $\Delta t_{measure}$ may include a first time period when the blower 112 and at least one air treatment component are operating and a second time period when only the blower is operating 112 (the first and second time periods may not be equal in duration). This allows for a determination of how the temperature gradient $\Delta T_i$ is affected by operation of the blower both with and without operation of air treatment component 114. As used herein, temperature gradient $\Delta T_i$ refers to the difference in air temperature at the thermostat and the air temperature in room i, which may be measured at multiple points in time during $\Delta t_{measure}$ as stated.

Next, in step 206, a model $M_{\Delta Ti}$ is provided of the temperature gradient $\Delta T_i$ between the temperature at the thermostat $T_{ST}$ and the temperature $T_i$ of room i as function of the operating state of the HVAC system. For example, as further described below, model $M_{\Delta Ti}$ can be expressed mathematically to provide the relationship between operation of one or more components 112 and 144 of HVAC system 116 and the temperature gradient $\Delta T_i$. A variety of different such models may be used and an example is provided below.

In step 208, steps 202, 204, and 206 are repeated for a total of N−1 rooms in building 120 so that a total of N rooms are modeled. For example, controller 124 could signal display 126 to instruct the user to move wireless temperature sensor to room 102, 104, and then 106 so as to measure temperatures in each room i and at thermostat 110 over a time period $\Delta t_{measure}$ and provide N−1 additional models $\Delta T_i$ for each additional room for a total of N such models. As stated above, the present invention does not require that a model be developed for every room of building 120 but the ability of the HVAC system 116 (which includes thermostat 110, controller 124, and display 126) to reduce temperature gradients in building 120 may be improved as the number of rooms that are modeled is increased.

An overall model $M_{\Delta T-ALL}$ of the N rooms in building 120 is created in step 210. Model $M_{\Delta T-ALL}$ provides the relationship between the state of the HVAC system and the temperature gradients between the thermostat 110 and the temperature in each of the N rooms. For example, model $M_{\Delta T-ALL}$ can be used to predict the temperature gradients between the thermostat 110 and each room i if blower 112 of the HVAC system is operated for a period time with at least one air treatment component 114 active. Model $M_{\Delta T-ALL}$ can also be used to predict the temperature gradients between the thermostat 110 and each room i if blower 112 of the HVAC system is operated for a period time with all air treatment components 114 inactive. Model $M_{\Delta T-ALL}$ can also be used to predict the temperature gradients between the thermostat 110 and each room i if both blower 112 of the HVAC system and all air treatment components 114 inactive for a period of time.

Multiple techniques may be used for performing step 210. For example all models $M_{\Delta Ti}$ for each room i may be added together after all N models have been created so as to provide model $M_{\Delta T-ALL}$. Alternatively, each model $M_{\Delta Ti}$ can be added sequentially to previously developed models as each model $M_{\Delta Ti}$ is developed until N rooms have been modeled so as to create $M_{\Delta T-ALL}$. Other techniques for combining N models $M_{\Delta Ti}$ to create the overall model $M_{\Delta T-ALL}$ may be used as well.

In step 212, model $M_{\Delta T-ALL}$ is using to determine whether to operate blower 112 so as to reduce one or more temperature gradients in the building. Several different control schemes may be employed for this step. For example, model $M_{\Delta T-ALL}$ could be employed to predict the temperatures $T_{BL-ON}$ in the building in each of the N rooms (from which the temperature gradients between the thermostat 110 and each room i could also be determined) if blower 112 of the HVAC system is operated for a period time. Model $M_{\Delta T-ALL}$ could also be applied to predict the temperatures $T_{BL-OFF}$ in the building if the HVAC system is off for the same period of time—i.e. if the blower 112 and all air treatment components 114 are inactive or off.

Using this temperature information, a determination can be made as to whether to operate blower 112. For example, if the average of temperatures $T_{BL-OFF}$ is a greater than the average of temperatures $T_{BL-ON}$, or exceeds the average of temperatures $T_{BL-ON}$ by some predetermined value, then blower 112 and/or one or more air treatment components 114 can be activated. Multiple different techniques could be applied for computing such averages. Other control schemes may be applied as well.

A variety of models may be used to create model $M_{\Delta Ti}$ and the overall model $M_{\Delta T-ALL}$. One such modeling technique will now be described but others may be used as well.

In one exemplary aspect of the present invention, $M_{\Delta T-ALL}$ provides a model of the temperature $T_i$ of each room i as a function of time and the state (u) of the HVAC system 116. This model can be generated from partial information about the actual temperature in one or more of the rooms i. An algorithm, for example, in controller 124 of display 126 instructs the user or a resident of the building to move a temperature sensor around the house at specified times, which provides temperature information to controller 124 that is stored by controller 124. The room i (such as room 100, 102, 104, or 106) changes with time. For the following discussion, it is assumed that the building has an HVAC system that includes a blower B, a heater H, and an air conditioner (e.g., air cooler) A. The variables needed to create model $M_{\Delta T-ALL}$ include:

Measured temperature in each room i: $T=[T_0, T_1, \ldots, T_{n-1}]^T$

State of the Blower (B), Heater (H), Air Conditioner (A): $u=[S_B, S_H, S_A]^T$

Partial information for temperature in each room: $\tilde{T}=[\hat{T}_0, \hat{T}_1, \ldots, \hat{T}_i, \hat{T}_{i+1}, \ldots \hat{T}_{n-1}]^T$ (where $\hat{T}_j$ is estimated temperature, and $T_i$ is measured temperature)

A generalized equation for the prediction of room temperature is given by equation (1), and a generalized algorithm for learning the model (ψ) (e.g., overall model) is given by equation (2).

$$\tilde{T}(k+1) = \psi_j(\tilde{T}(k), u(k+1)) \quad \text{Eq. (1)}$$

$$\psi(j+1) = \phi(\psi(j), \tilde{\sigma}, U) \quad \text{Eq. (2)}$$

where:
$\psi_i(j)$ is the jth consecutive model of the house.
$\phi(\cdot, \cdot, \cdot)$ is the adaption (learning) algorithm
$\tilde{\sigma}$ is array (or singleton) of $\tilde{T}$.
U is array (or singleton) of u(k)

Adaption Example. The following is a simple example of adaption using a dynamic learning algorithm. The model setup assumes that the thermostat temperature is known at all times and that a second room is being measured. Further that second room changes based on the aforementioned algorithm. The model (3) tracks a static temperature offset from the thermostat temperature based on the HVAC state. A simplified adapter for this model is show in (4).

$$\psi = T_i(k+1) = \text{measured for } i=0; \text{ AND}$$

$$\psi = \tilde{T}_i(k+1) = T_0(k+1) + \alpha_i u(k+1) \text{ for } i>0 \quad (3)$$

$$\phi = \alpha_i(k+1) = \alpha_i(k) \text{ for } T_i \text{ unmeasured; AND}$$

$$\phi = \alpha_i(k+1) = \alpha_i(k) + \rho(T_i(k) - T_0(k) - \alpha_i(k)u(k))/T_i(k) \text{ for } T_i \text{ measured} \quad (4)$$

where:
$T_0$ is thermostat actual temperature.
$T_i$, for i>0 is actual room temperature.
$\hat{T}_i$, for i>0 is estimated room temperature.
$S_B$, $S_H$, $S_A$ are binary values [0, 1]
$\alpha_i \in R^{1 \times 3}$
Initialization of all variables assumed to be appropriate in scale and range.

The main goal of HVAC blower control is to reduce the energy consumption (when compared to running the blower constantly) while also reducing the temperature difference between rooms. This is generally accomplished by minimizing an optimization function. For this example we will consider a more simple case.

(1) Estimate the temperature (T(k+1)) for the case when the blower is in the on-state and the case when the blower is in the off-state.
$T_n(k)$ for blower in the on-state.
$T_f(k)$ for blower in the off-state.
(2) Calculate the average difference between the two estimates using (5).

$$d\bar{T}_n = \frac{1}{n}\sum T_{ni}(k) - T_{fi}(k) \quad (5)$$

(3) If difference is great enough based on the cooling and heating threshold constants ($\zeta_c$, $\zeta_h$) turn the blower on.
Cooling: if $d\bar{T}_n < \zeta_c$ turn on blower.
Heating: if $d\bar{T}_n > \zeta_h$ turn on blower.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of reducing temperature gradients in a building having multiple rooms, the building also having an HVAC system that includes at least one thermostat, at least one blower, one or more air treatment components for cooling the air, heating the air, or both, the method comprising the steps of:

measuring a temperature $T_{ST}$ at the thermostat and a temperature $T_i$ of a room i in the building over a period of time $\Delta t_{measure}$ that includes operation of the HVAC system;

determining the operating states of the HVAC system during the period of time $\Delta t_{measure}$;

providing a model $M_{\Delta Ti}$ of a temperature difference $\Delta T_i$ between the temperature at the thermostat $T_{ST}$ and the temperature $T_i$ of room i as function of the operating state of the HVAC system;

repeating said steps of measuring, determining, and providing for N−1 additional rooms in the building so as to provide a model $M_{\Delta Ti}$ of the temperature difference $\Delta T_i$ between the temperature at the thermostat $T_{ST}$ and the temperature $T_i$ of each such additional room as a function of the operating state of the HVAC system for a total of N rooms;

combining N models $M_{\Delta Ti}$ of the N rooms in the building so as to create an overall model $M_{\Delta T-ALL}$ of the building; and using the model $M_{\Delta T-ALL}$ to determine whether to operate the blower so as to reduce one or more temperature gradients in the building, wherein using the model $M_{\Delta T-ALL}$ to determine whether to operate the blower comprises using model $M_{\Delta T-ALL}$ to predict temperatures $T_{BL-ON}$ in the building when the blower is operated, using model $M_{\Delta T-ALL}$ to predict temperatures $T_{BL-OFF}$ in the building when the blower is not operated, and activating the blower, at least one of the air treatment components, or both when the difference between $T_{BL-ON}$ and $T_{BL-OFF}$ exceeds a predetermined value.

2. The method of reducing temperature gradients in a building having multiple rooms as in claim 1, wherein said step of providing a model $M_{\Delta Ti}$ comprises:

operating the blower of the HVAC system so as to reduce $\Delta T_i$ while all air treatment components are in an off state; and determining a relationship between the operation of the blower and the temperature difference $\Delta T_i$ when all air treatment components are in an off state.

3. The method of reducing temperature gradients in a building having multiple rooms as in claim 1, wherein said step of providing a model $M_{\Delta Ti}$ comprises:

operating the blower and the one or more air treatment components of the HVAC system so as to reduce $\Delta T_i$;

determining a relationship between the temperature difference $\Delta T_i$ and the operation of the blower and the one or more air treatment components from said step of operating;

running the blower of the HVAC system so as to reduce $\Delta T_i$ while all air treatment components are in an off state; and ascertaining the relationship between the operation of the blower and the temperature difference $\Delta T_i$ when all air treatment components are in an off state from said step of running.

4. The method of reducing temperature gradients in a building having multiple rooms as in claim 1, wherein said step of using the model $M_{\Delta T-ALL}$ comprises:

employing model $M_{\Delta T-ALL}$ to predict the temperatures in each room i of the N rooms after operating the blower for a period of time $\Delta t_{PREDICT}$;

applying model $M_{\Delta T-ALL}$ to predict the temperatures in each room i of the N rooms with the HVAC system off for the period of time $\Delta t_{PREDICT}$; and determining whether to operate the blower based on the results of said steps of employing and applying.

5. The method of reducing temperature gradients in a building having multiple rooms as in claim 1, further comprising a step of calculating the period of time $\Delta t_{measure}$ for use in said steps of measuring and determining.

6. The method of reducing temperature gradients in a building having multiple rooms as in claim 1, wherein said step of measuring comprises measuring at least one of the Temperature $T_{ST}$ or the temperature $T_i$ at predetermined intervals of time during the period of time $\Delta t_{measure}$.

7. The method of reducing temperature gradients in a building having multiple rooms as in claim 1, wherein said step of determining the operating state of the HVAC system comprises detecting whether the at least one blower, the one or more air treatment components, or both, are in an on or off condition.

8. The method of reducing temperature gradients in a building having multiple rooms as in claim 1, further comprising a step of operating the blower based on said step of determining whether to operate the blower.

9. The method of reducing temperature gradients in a building having multiple rooms as in claim 1, further comprising a step of operating the blower and at least one of the air treatment components based on said step of determining whether to operate the blower.

10. A method of reducing temperature gradients in a building that includes multiple temperature zones, the method comprising the steps of:

obtaining the temperatures at a thermostat in the building and in a first temperature zone of the building over a first period of time, the building having multiple temperature zones, the building also having an HVAC system that includes at least one thermostat, at least one blower, one or more air treatment components for cooling the air, heating the air, or both, the first period of time occurring while the blower and at least one air treatment component of the HVAC system is operating;

acquiring the temperatures at the thermostat and the first temperature zone of the building over a second period of time, the second period of time occurring while only the blower of the HVAC system is operating;

developing a model of the temperature in first temperature zone as a function of the state of the HVAC system using temperatures from said steps of obtaining and acquiring;

repeating said steps of obtaining, acquiring, and developing for one or more additional temperature zones of the building so as to provide a model for each such additional temperature zone;

combining the models from said steps of developing and repeating so as to provide an overall model for multiple temperature zones of the building; and using the overall model to determine when to operate the blower of the HVAC system so as to reduce temperature gradients between one or more temperature zones in the building and the thermostat, wherein using the overall model to determine when to operate the blower comprises predicting with the overall model the temperatures in one or more temperature zones when the blower of the HVAC system is operated for a period of time, calculating with the overall model the temperatures in one or more temperature zones when the blower of the HVAC system is not operated for a period of time operating the blower when the average of the temperatures from said step of calculating exceeds the average of the temperatures from said step of predicting.

11. The method of reducing temperature gradients in a building as in claim 10, further comprising a step of operating at least one air treatment component, when the average of the temperatures from said step of calculating exceeds the average of the temperatures from said step of predicting.

12. The method of reducing temperature gradients in a building as in claim 10, wherein the first period of time and the second period of time are of equal length.

13. The method of reducing temperature gradients in a building as in claim 10, wherein said steps of obtaining and acquiring further comprise placing a temperature sensor in the first temperature zone of the building.

14. The method of reducing temperature gradients in a building as in claim 13, wherein said step of repeating comprises moving the temperature sensor between different temperature zones of the building.

15. The method of reducing temperature gradients in a building as in claim 10, further comprising a step of operating at least one air treatment component so as to reduce a temperature gradient between the temperature at the thermostat and the temperature in one or more temperature zones of the building.

16. The method of reducing temperature gradients in a building as in claim 10, further comprising a step of operating the blower so as to reduce a temperature gradient between the temperature at the thermostat and the temperature in one or more temperature zones of the building, said step of operating the blower occurring over a period of time during which no air treatment component is operating.

17. The method of reducing temperature gradients in a building as in claim 10, further comprising a step of determining the period of time, speed, or both at which to operate the blower so as to reduce temperature gradients between the temperature and the thermostat and the temperature in one or more temperature zones of the building.

\* \* \* \* \*